United States Patent [19]

Haraga et al.

[11] Patent Number: 4,594,281
[45] Date of Patent: Jun. 10, 1986

[54] LIGHTWEIGHT IMPACT ABSORBING PANEL

[75] Inventors: Kousuke Haraga, Hyogo; Katutoshi Hattori; Kazumi Yamamoto, both of Aichi, all of Japan

[73] Assignee: Mitsubishi Denki Kabushiki Kaisha, Tokyo, Japan

[21] Appl. No.: 714,324

[22] Filed: Mar. 21, 1985

[30] Foreign Application Priority Data

Apr. 5, 1984 [JP] Japan ............................ 59-50169[U]

[51] Int. Cl.⁴ ............................................ B32B 3/28
[52] U.S. Cl. .................... 428/172; 428/182;
428/313.9; 428/317.5; 428/317.9; 428/325;
428/331; 428/332
[58] Field of Search ............... 428/325, 406, 168, 172, 428/182, 313.9, 317.1, 317.5, 317.7, 331, 332; 427/207.1, 208.2, 208.4

[56] References Cited

U.S. PATENT DOCUMENTS

| 3,313,147 | 4/1967 | Haraga et al. | 428/182 |
| 3,917,547 | 11/1975 | Massey | 428/313.9 |
| 4,101,704 | 7/1978 | Hiles | 428/313.9 |
| 4,367,296 | 1/1983 | Gagliani et al. | 428/313.9 |
| 4,414,257 | 11/1983 | Haraga et al. | 428/182 |
| 4,433,023 | 2/1984 | Ohta et al. | 428/182 |

FOREIGN PATENT DOCUMENTS 3123134  12/1982  Fed. Rep. of Germany ... 428/313.9

Primary Examiner—Paul J. Thibodeau
Attorney, Agent, or Firm—Sughrue, Mion, Zinn, Macpeak, and Seas

[57] ABSTRACT

A panel used as a material for forming a wall of a general building material such as an elevator is constituted from a rigid front plate and a rigid back plate having a corrugated cross-section adhered to the rear side of the front plate by means of a reinforcing bonding agent made of a synthetic resin material. The synthetic resin bonding agent contains at least one hollow body in order to minimize the specific gravity of the bonding agent to reduce the weight of the panel.

6 Claims, 10 Drawing Figures

FIG. 5
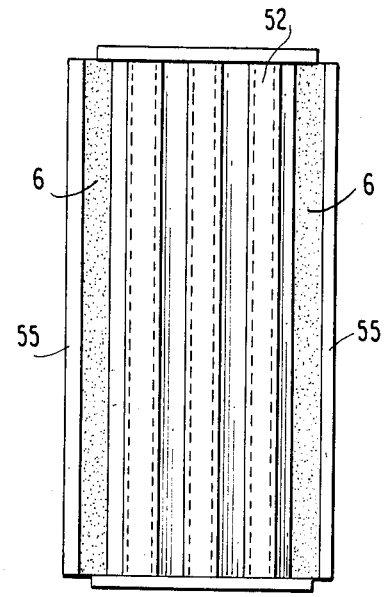

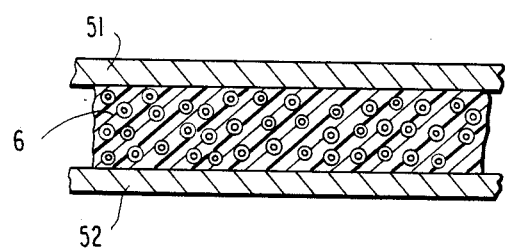
FIG. 10

LIGHTWEIGHT IMPACT ABSORBING PANEL

BACKGROUND OF THE INVENTION

1. Field of the Invention

This invention relates to a panel for use as general building materials, such as, for example, a panel for use with a cage of an elevator.

2. Description of the Prior Art

Generally, a conventional panel which is used as a wall surface of an elevator cage is quite heavy.

For example, as shown in FIGS. 1, 2 and 3, a conventional panel of an elevator has a construction similar to a panel which is disclosed in Japanese Laid-Open Utility Model No. 57-120574. Referring to FIGS. 1 to 3, a cage 1 of an elevator includes a doorway 2, a door 3 for opening and closing the doorway 2, a floor 4, and a plurality of vertical panels 5 extending from the floor 4 to form surrounding walls of the cage 1. Each of the panels 5 includes a front plate 51 constituting an essential part thereof. The fron plate 51 is a steel plate and has a cross-sectional shape as shown in FIG. 3 wherein opposite end portions are reversely bent. The panel 5 further includes a thin steel back plate 52 which is bent into corrugated cross-sectional shape. The back plate 52 has faces 52a opposed to a rear face of the front plate 51 and is adhered thereto by means of bonding agent 53.

Each of the panels 5 which have a construction as described above is installed such that the front plate 51 faces the inside of the cage 1 so as to form an inner wall face of the cage 1.

In the conventional cage 1 of the elevator having such a construction as described above, it is necessary for the front plate 51 to have a certain degree of thickness in order to prevent the wall face thereof from being dented by various impact forces caused by collision of a bogie truck carrying a load out of or into the cage 1, of hand baggage, or bicycle, or the like, and to prevent production of noises or the like by small vibrations within the panels upon running of the elevator. As a result, each panel 5 must have a large weight so that normally installation of the panel to the elevator requires two workers. In addition, such panels are large obstacles to reduction of the size and weight of the entire elevator system.

SUMMARY OF THE INVENTION

This invention eliminates such defects of a conventional panel as described above, and it is an object of the invention to provide a panel of reduced weight, which readily endures various impact forces so that it is difficult to dent the front plate thereof and which will not produce small vibrations.

These objects are attained by a construction of a panel which includes a front plate, a corrugated back plate adhesively mounted on a rear face of the front plate by a reinforcing synthetic resin layer adhered to and formed between the rear face of the front plate and the rear plate and which resin layer contains hollow bodies therein.

BRIEF DESCRIPTION OF THE DRAWINGS

FIG. 5 is a rear elevational view, similar to FIG. 2, of the panel of FIG. 4.

FIG. 10 is an enlarged illustrative view of part of FIG. 4.

DETAILED DESCRIPTION OF THE PREFERRED EMBODIMENT

A panel according to an embodiment of the present invention is used in forming a wall of a cage of an elevator and has a construction, as hereinafter described in detail. It comprises a front plate having a considerably reduced thickness compared with the thickness of a conventional front plate, and a back plate disposed on the rear face of the front plate such that opposed faces of convex portions of a corrugated configuration of the back plate are adhered to the front plate using a synthetic resin material containing a hollow body or hollow bodies therein so as to minimize the specific gravity of the synthetic resin material layer. A reinforcing layer of the same synthetic resin material containing the hollow bodies that is used for adhesion of the rear face of the front plate to the convex portions of the back plate is formed on the remaining portions of the front plate other than the portions of the rear face of the front plate adhering the front plate to the back plate.

Now, an embodiment of the invention will be described with reference to a cross-sectional view of FIG. 4 and a front elevational view of FIG. 5.

Figure 1:
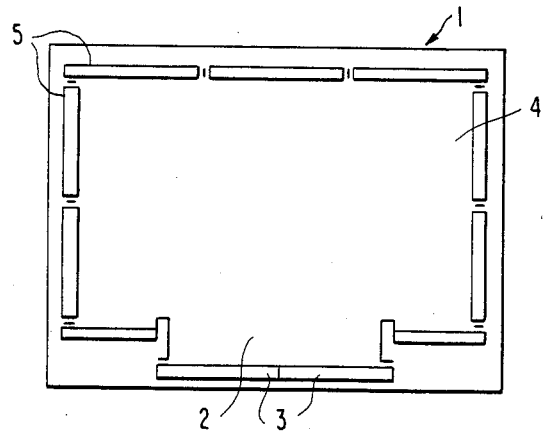
FIG. 1 is a horizontal cross-sectional view, in diagrammatic representation, showing a cage of a conventional elevator.
Figure 2:
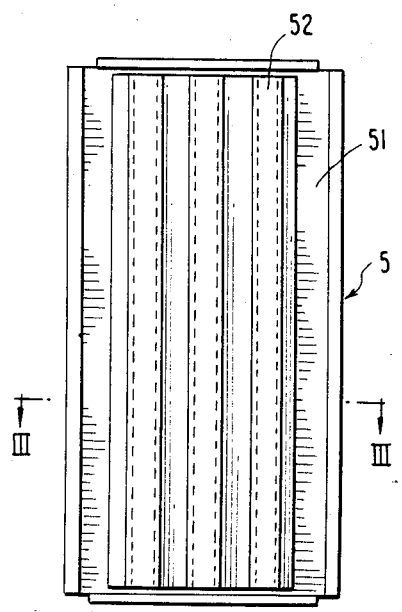
FIG. 2 is a rear elevational view of a panel for a cage of a conventional elevator.
Figure 3:
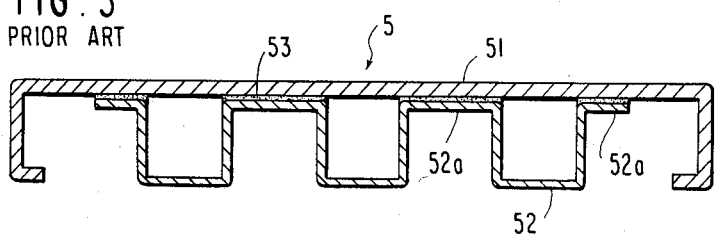
FIG. 3 is an enlarged cross-sectional view taken along line III—III of FIG. 2.
Figure 4:
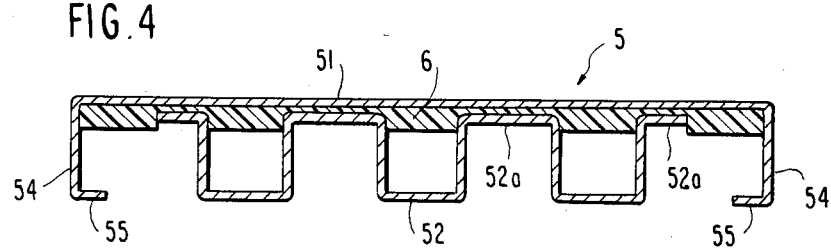
FIG. 4 is a similar cross-sectional view of a panel forming an embodiment of the present invention.

In FIGS. 4 and 5, like parts or components are designated by like or corresponding reference numerals to those of FIGS. 1 to 3. Reference numeral 6 designates a synthetic resin material containing hollow bodies therein.

Front plate 51, which is conventionally made of a metal plate having a thickness of more than 1.2 mm, is replaced, in accordance with the present invention, by a metal plate having a thickness of from 0.6 to 0.8 mm in order to reduce the weight of the panel. However, as the front plate 51 is thinner, then likelihood of dents to the front plate 51 due to impact forces and the presence of small vibrations becomes significantly larger. Accordingly, in accordance with the present invention, a reinforcing layer 6 of a synthetic resin material having a thickness of 0.5 to 5 mm which is preferable for practical use is formed on portions other than opposed faces 52a of the back plate 52 which constitute adhered portions to the front plate 51, as shown in FIG. 4, in order to prevent dents to the front plate 51 due to impact forces and to reduce the possibilities of small vibrations occurring during elevator use. Meanwhile, the same synthetic resin material is used for adhesion of the rear face of the front plate 51 to the opposed faces 52a of the back plate 52 to the rear face of the front plate 51. The thickness of the synthetic resin material on the opposed faces 52a of the corrugated back plate 52 constituting the adhered portions is preferably 0.15 to 0.3 mm since the thickness below the former value is not preferable from the point of view of the adhesion strength and shock resistance.

Although the synthetic resin material is applied in the thickness of 0.5 to 5 mm to portions other than the adhered portions of the rear face of the front plate 51 to the back plate 52, application in such thickness will considerably increase the weight of the layer 6 of the synthetic resin material, thus raising of the problem of increase rather than reduction of the weight. Accordingly, in the present invention, a hollow body or bodies of glass or ceramic is or are contained in the synthetic resin material in order to reduce the weight of the panel.

The synthetic resin material to which a hollow body or bodies is or are added is generally an epoxy resin or a polyester resin, which has a low peeling strength and a low adhesion impact strength. Accordingly, the embodiment of the present invention, as a preferable resin material, an urethane resin, particularly one which has a Shore D hardness of 40 to 60 degrees after hardening, is used in order to assure that the peeling strength and the adhesion impact strength are high and that prevention of dents to a front plate due to impact forces and control of small vibrations are achieved.

Where hollow bodies made of a glass material are used, those which have a true specific gravity of 0.20 to 0.40 may be used, but particularly such hollow bodies having a grain size distribution in which those hollow bodies which have a true specific gravity of 0.28 to 0.33 occupy 60 to 70 percent by volume may be added by 10 to 30 parts to 100 parts of the synthetic resin material (as lower than 10 parts will have no effect for reduction of the weight and higher than 30 parts cannot be added). This attains reduction in weight and improves the strength of the resin material itself and the adhesion strength, the shock resistance and prevention of small vibrations within the panel.

Where hollow bodies made of a ceramic material are used, those which have a true specific gravity of 0.5 to 0.8 may be used, but particularly such hollow bodies having a grain size distribution in which those hollow bodies which have a true specific gravity of 0.6 to 0.7 occupy 60 to 70 percent by volume may be best added in the amount of 30 to 50 parts to 100 parts of the synthetic resin material (as lower than 30 parts will have no effect for reduction of the weight and higher than 50 parts cannot be added). This attains reduction in weight and improves the strength of the resin material itself and the adhesion strength, the shock resistance and prevention of small vibrations within the panel. It is to be noted that hollow bodies made of a glass material are better than hollow bodies made of a ceramic material for reduction in weight, but hollow bodies made of a ceramic material are cheaper.

In addition, according to the embodiment of the invention, in order that, in the case of hollow bodies made of either a glass material or a ceramic material, the thickness of the layer 6 of the synthetic resin material between the opposed faces 52a forming the adhering portions of the back plate and the front plate 51 may not become too thin so as to allow the layer 6 of the synthetic resin material to serve as a spacer, those hollow bodies having a particle diameter of 150 μm to 200 μm are in excess of 5 weight percent of the entire hollow substance. As a result, the thickness of the layer 6 of the synthetic resin material between the rear face of the front plate 51 and the opposed faces 52a of the back plate 52 can be easily controlled to 0.15 to 0.3 mm.

In the embodiment described above, the layer 6 of the synthetic resin material containing a hollow body or bodies therein is not formed on bent portions 54 at opposite ends of the front plate 51 and further bent portions 55 extending from ends of the bent portions 54, but according to the invention, a series of layers 6 of the synthetic resin material containing a hollow body or bodies may be formed on the bent portions 54 and on the rear face of the further bent portions 55 extending from the bent portions 54.

Further, while in the embodiment described above the hollow bodies contained in the synthetic resin material are made of a glass or ceramics material, they may otherwise be made of a porous material such as cork. Or else, the hollow bodies may be made of and produced by drying and baking volcanic ashes or pumice which are widely accumulated on the Ohsumi peninsula or the Satsuma peninsula in Kagoshima prefecture, Japan, due to explosion of volcanoes. Such substances are generally called "Shirasu balloons" in Japan, eight to nine tenths or so in volume of Shirasu balloons having a diameter (an outer diameter) of 75 μm or so, two thirds to one half or so having a diameter of less than 44 μm or so, and some of Shirasu balloons having a diameter of up to 200 μm (0.2 mm) or so.

Figure 6:
FIGS. 6 to 9 are cross sectional views illustrating different hollow bodies.
Figure 7:
Figure 8:
Figure 9:

Reference is now had to FIGS. 6 to 9 which are enlarged cross sectional view of different hollow bodies, and FIG. 6 illustrates a hollow body which is spherical in configuration and has a circular hollow cavity therein. FIG. 7 illustrates another hollow body which is spherical in configuration and has therein a plurality of circular or elliptical hollow cavities which are independent of (not communicated with) each other. FIG. 8 illustrates a further hollow body which is spherical in configuration and has a plurality of independent noncircular cavities therein. FIG. 9 illustrates a yet another hollow body which is not spherical in configuration and has therein a plurality of cavities some of which extend to an outer surface of the hollow body to define holes or cracks in the surface.

As apparent from the examples described above, the hollow bodies are not limited to those which are spherical in configuration and may have any number of cavities more than one contained therein. Such cavities need not necessarily be circular in cross section and may contain gas such as air therein or otherwise be vacuum.

Further, while in the embodiment described above particles of a diameter from 150 to 200 μm occupy 5 percent or more in weight of the entire hollow substance and particles having a diameter less than 150 μm occupy the remaining 95 percent or less of the entire hollow substance, particles having a diameter up to 250 μm or so are also allowable for use. However, in order for a layer of a synthetic resin material to have a reduced thickness, particles to be contained 5 percent or more in weight preferably have a particle size or diameter from 150 to 200 μm as in the embodiment described above. In addition, the hollow substance may include therein a mixture of any of hollow bodies of glass and ceramics and of porous materials.

FIG. 10 illustrates, for reference, details of a layer of a synthetic resin material containing a hollow substance as shown in FIG. 6 and corresponds to an enlarged view of part of FIG. 4. It is to be noted, however, that since FIG. 10 is drawn without taking actual diameters of the hollow substance, an actual thickness of the synthetic resin layer, and so on, into consideration, a panel does not actually present such a cross sectional view as seen in FIG. 10.

While the embodiment has been described as a wall composing panel for a cage of an elevator, panels of the present invention can also be used as a building material for other general buildings.

As apparent from the foregoing description, the panel of the present invention has the effect that it is strong against shock and prevents small vibrations while it is light in weight.

What is claimed is:

1. In a panel comprising:
   a front plate made of a rigid material;
   a back plate mounted on the rear face of said front plate and having a corrugated cross-section, said back plate being made of a rigid material; and
   a reinforcing layer made of a synthetic resin material adhering opposed faces of said front plate and said back plate to each other;
   the improvement wherein said front plate is less than 1.2 mm in thickness, said synthetic resin is urethane resin with a Shore D hardness in the range of 40° to 60°, said synthetic resin reinforcing layer includes hollow particles therein, more than 5% weight of the total weight of the hollow particles are of a diameter ranging from 150 mu m to 250 mu m, to create a reinforcing layer of relatively low specific density, of high impact strength and of good vibration prevention quality, and wherein the reinforcing layer covers the entire rear face of said front plate, the thickness of the reinforcing layer adhering to opposed faces of the front plate and back plate is in the range from 0.5 mm to said front plate at portions other than that adhering the 5 mm.

2. A panel according to claim 1, wherein said corrugated back plate has surfaces of convex portions which serve as adhering faces by which said back plate is adhered to said front plate, and the thickness of said reinforcing synthetic resin layer on said adhering faces is smaller than the thickness of said reinforcing synthetic resin layer on said back plate other than at said adhering faces.

3. A panel according to claim 1, wherein said hollow particles are of a material selected from the group consisting of glass and ceramics.

4. A panel according to claim 1, wherein said front plate has, at opposite ends thereof, reversely bent portions, and said back plate has a smaller overall length than that of said front plate, and the height of the corrugations of said back plate is substantially the same as the height of said reversely bent portions of said front plate.

5. A panel according to claim 1, wherein said particles comprise dried and baked volcanic ash or pumice.

6. A panel according to claim 1, wherein said front plate is formed of metal having a thickness of about 0.6 to 0.8 mm.

* * * * *